United States Patent
Hsu (10) Patent No.: US 11,269,739 B2
(45) Date of Patent: Mar. 8, 2022

(54) METHOD AND SYSTEM FOR MANAGING BACKUP DATA

(71) Applicant: QNAP SYSTEMS, INC., New Taipei (TW)

(72) Inventor: Chin-Hsing Hsu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 0 days.

(21) Appl. No.: 17/012,094

(22) Filed: Sep. 4, 2020

(65) Prior Publication Data
US 2021/0303417 A1    Sep. 30, 2021

(30) Foreign Application Priority Data
Mar. 26, 2020 (TW) ................................ 109110359

(51) Int. Cl.
*G06F 12/00* (2006.01)
*G06F 11/14* (2006.01)
*G06F 3/06* (2006.01)

(52) U.S. Cl.
CPC .......... *G06F 11/1469* (2013.01); *G06F 3/067* (2013.01); *G06F 3/0619* (2013.01); *G06F 3/0629* (2013.01); *G06F 3/0652* (2013.01); *G06F 3/0653* (2013.01); *G06F 11/1446* (2013.01); *G06F 11/1448* (2013.01); *G06F 11/1451* (2013.01); *G06F 11/1461* (2013.01); *G06F 11/1464* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,200,926 | B1* | 6/2012 | Stringham | G06F 11/1448 711/162 |
| 8,504,529 | B1* | 8/2013 | Zheng | G06F 11/1469 707/679 |
| 2003/0188116 | A1 | 10/2003 | Suzuki et al. | |
| 2012/0011336 | A1* | 1/2012 | Saika | G06F 3/0604 711/162 |
| 2012/0123999 | A1* | 5/2012 | Ashutosh | G06F 16/137 707/618 |

(Continued)

FOREIGN PATENT DOCUMENTS

CN    111124293 A  *  5/2020
WO    2018164782       9/2018

*Primary Examiner* — John A Lane
(74) *Attorney, Agent, or Firm* — WPAT, PC (57) ABSTRACT

A method for managing backup data units stored in a data server is provided. The backup data may include a first backup data unit established by copying a source data unit into the data server in response to a data backup command received at a first time point. The method includes: acquiring a specified storage space in response to a data backup command received at a second time point; copying the first backup data unit to the specified storage space in a lightweight copy manner; writing differential data contents between the source data unit presented at the second time point and the source data unit presented at the first time point into the lightweight-copied first backup data unit in the specified storage space; and defining the resulting data stored in the specified storage space as a second backup data unit, wherein the second time point is later than the first time point.

11 Claims, 6 Drawing Sheets

(56) References Cited

U.S. PATENT DOCUMENTS

2012/0124306 A1\* 5/2012 Abercrombie ...... G06F 11/1451
 711/162
2017/0371947 A1\* 12/2017 Golander ................ G06F 16/13

\* cited by examiner

METHOD AND SYSTEM FOR MANAGING BACKUP DATA

FIELD OF THE INVENTION

The present invention relates to method and system for managing backup data, and more particularly to method and system for managing backup data, which are capable of supporting a WORM (write once read many) mechanism.

BACKGROUND OF THE INVENTION

In a modern society, a variety of tasks required for daily lives are conducted electronically. Therefore, security of electronic data is critical for normal operations of the society. Existing technologies have provided various ways to secure electronic data in many different aspects. For example, data backup technologies are commonly used to avoid irreparable data loss and make it possible to recover data in case data are unintentionally lost.

However, different versions of point-in-time backup data units from single source data unit may occupy a huge amount of storage space. The point-in-time backup data units without data reduction mechanisms may need more time to read for restoring which cannot meet recover-time-objective (RTO). For saving storage space, then a large amount of operations would be required to process a source data unit into a backup data unit and recover the backup data unit into the source data unit. Both cases cause distress to users.

SUMMARY OF THE INVENTION

Therefore, the present invention provides a method for managing backup data, by which the storage space required for backup data can be reduced and the data backup/restoring operations can be simplified.

The present invention further provides a system for managing backup data units, which can perform data backup with minimized storage space and simplified operations, and furthermore, can achieve data backup objects in different ways.

In accordance with an aspect of the present invention, a method adapted to be used for managing backup data units stored in a data server is provided. The backup data units include a first backup data unit established by copying a source data unit into the data server in response to a data backup command received at a first time point. The method comprises: acquiring a specified storage space in response to a data backup command received at a second time point; copying the first backup data unit to the specified storage space in a lightweight copy manner; writing differential data contents between the source data unit presented at the second time point and the source data unit presented at the first time point into the lightweight-copied first backup data unit in the specified storage space; and defining the resulting data stored in the specified storage space as a second backup data unit, wherein the second time point is later than the first time point.

In accordance with another aspect of the present invention, a method for managing backup data units comprises: determining whether a head version of backup data unit corresponding to a source data unit to be backed up is existent in a data server when a data backup command is received; lightweight-copying the head version into a specified storage space of the data server to generate a lightweight-copied backup data unit if the head version is existent in the data server; incorporating, e.g. copying, differential data contents into the lightweight-copied backup data unit to generate a next-generation version of backup data in the specified storage space, wherein the differential data contents indicate a difference between the source data unit presented when the head version is generated and the source data unit presented when the data backup command is received; and updating the backup data unit being the next-generation version to the head version.

In accordance with a further aspect of the present invention, a system for managing backup data units comprises: a plurality of containers independent from one another and having respective codes; and a management device in communication with the containers, issuing a series of commands to sequentially execute the codes, thereby conducting a data backup operation. The codes include at least a first code executable to have contents of a first directory copied to a second directory in a lightweight copy manner; a second code executable to have data retrieved from a data source written into a third directory; and a third code executable to enable contents in a fourth directory to be protected by a WORM protecting mechanism.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
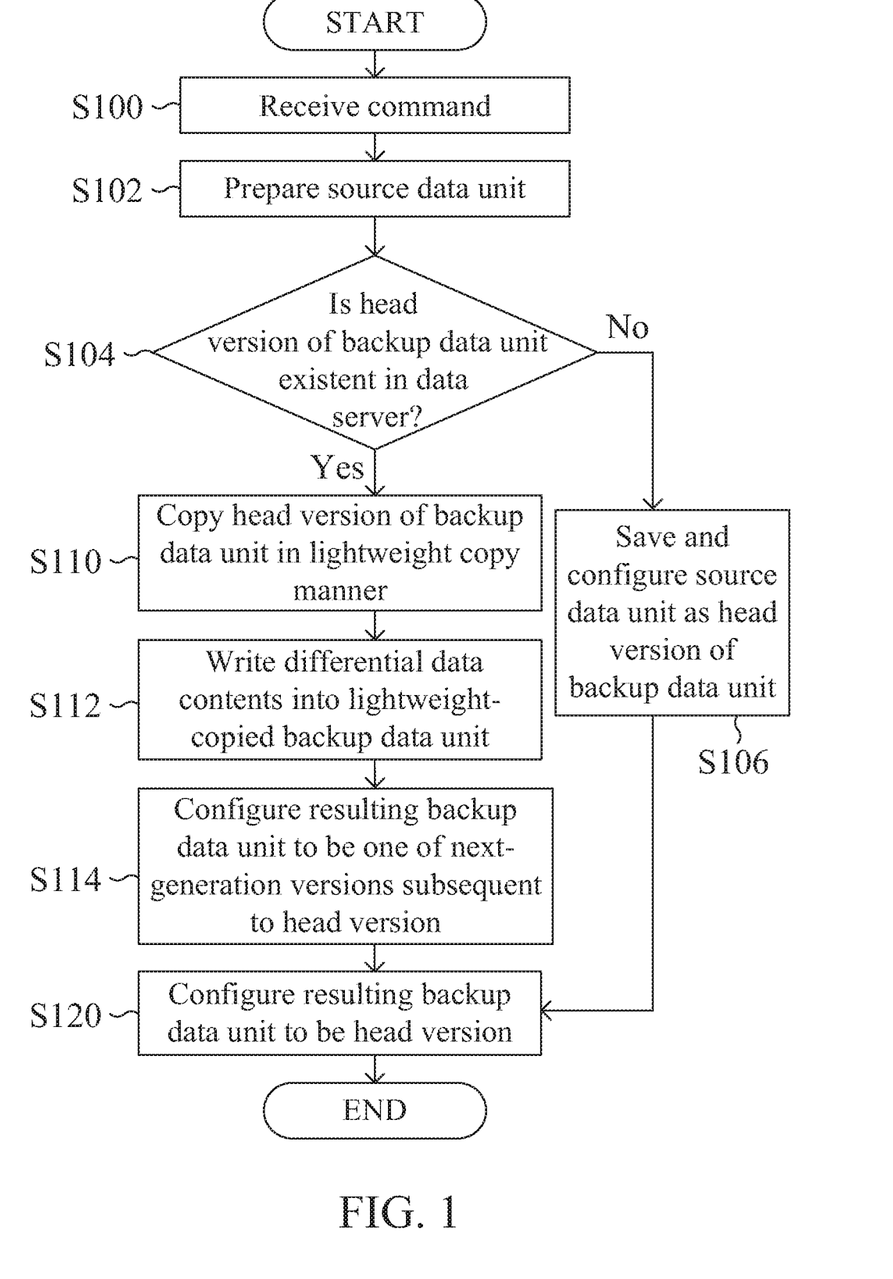
FIG. 1 is a schematic flowchart illustrating steps in a data backup stage of a method for managing backup data units according to an embodiment of the present invention.

Please refer to the flowchart of FIG. 1, which schematically illustrates steps in a data backup stage of a method for managing backup data units according to an embodiment of the present invention. In this embodiment, the steps in the data backup stage are initiated in response to a data backup command issued by a user or a program.

In response to the backup command (Step S100), a source data unit is prepared to be backed up to a data server (Step S102). The contents of data to be backed up may include all the subdirectories and files under a specified file directory. Meanwhile, a new file directory is built up in the data server as a storage space to store backup data units. Subsequently, among the stored backup data units, whether a head version corresponding to the source data unit has existed in the data server is determined (Step S104). If there is no corresponding head version, the source data unit would be directly copied to the new file directory built up in Step S102 to establish a backup data unit (Step S106), which is then configured to be the head version (Step S120).

On the other hand, if it is determined that a corresponding head version has existed in Step S104, the head version is copied into the new file directory built up in Step S102 in a lightweight copy manner (Step S110), and then a different part (hereinafter, "differential data contents") between the source data unit presented when the data backup command is received and the source data unit presented when the head version is established is written into the lightweight copied data unit (Step S112) to establish a new backup data unit in the new file directory. The backup data unit is configured to be one of next-generation versions subsequent to the head version (Step S114), and further configured to be the head version in lieu of the original one (Step S120).

In practice, the so-called "lightweight copy" operation mentioned above can be executed with a currently available command. For example, the command "cp-R—reflink=always Source Dest" can be executed to lightweight copying data from the directory "Source" to the directory "Dest". As a result, the files having the same contents of data blocks, which are respectively in the directory "Source" and the directory "Dest", would initially direct to the same storage space. Once there are new data written into the file or files in the directory "Dest", the modified data blocks of the files would be allocated and saved in another storage space. In other words, by way of lightweight copying the head version followed by writing in differential data contents, data backup can be effectively executed with a relatively small storage space.

Figure 2:
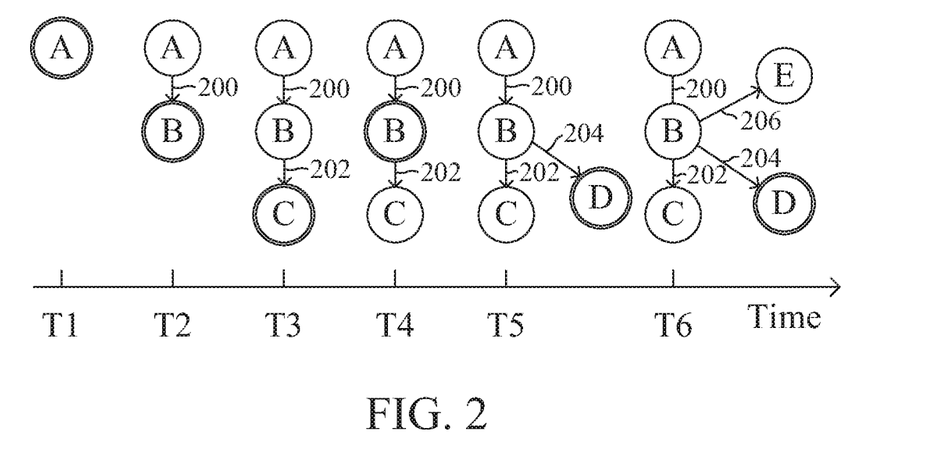
FIG. 2 is a scheme illustrating an exemplified time sequence of derivation from a source data unit to a series of backup data units according to an embodiment of the present invention.

For better understanding of the present invention by those skilled in the art, an embodiment is given as follows with reference to FIG. 2. FIG. 2 is a scheme illustrating a time sequence of the operations in the data backup stage as described above. As shown, the backup data unit A derived from a specified source data unit does not exist in the data server until time point T1. The backup data unit A is created in the data server by way of certain procedures developed according to the present invention, e.g. the above-described Steps S100, S102, S104, S106 and S120. Meanwhile, the backup data unit A is configured to be the head version. The head version may be labeled with metadata of the data server or contents of a specific file stored in the data server. The backup data unit A configured to be the head version can be quickly located and used as source data for next lightweight copy.

With the head version, i.e. the backup data unit A, another backup operation of the source data unit is subsequently performed by way of certain procedures developed according to the present invention, e.g. the above-described Steps S100, S102, S104, S110, S112, S114 and S120 at time point T2. As a result, a backup data unit B is created, as indicated by the arrow 200, and established as one of next-generation versions subsequent to the head version, which is currently the backup data unit A. The backup data unit B is then configured to be the head version in lieu of the backup data unit A. In other words, from time point T2, the head version has changed from the backup data unit A into the backup data unit B.

Afterwards, at time point T3, another backup operation is performed again with the backup data unit B as the head version by executing Steps S100, S102, S104, S110, S112, S114 and S120, thereby generating a backup data unit C. Likewise, as indicated by the arrow 202, the backup data unit C is established as one of next-generation versions subsequent to the head version, which is currently the backup data unit B. The backup data unit C is then configured to be the head version in lieu of the backup data unit B. In other words, from time point T3, the head version has changed from the backup data unit B into the backup data unit C. In this way, the source data unit will be backed up in stages with time.

Figure 3:
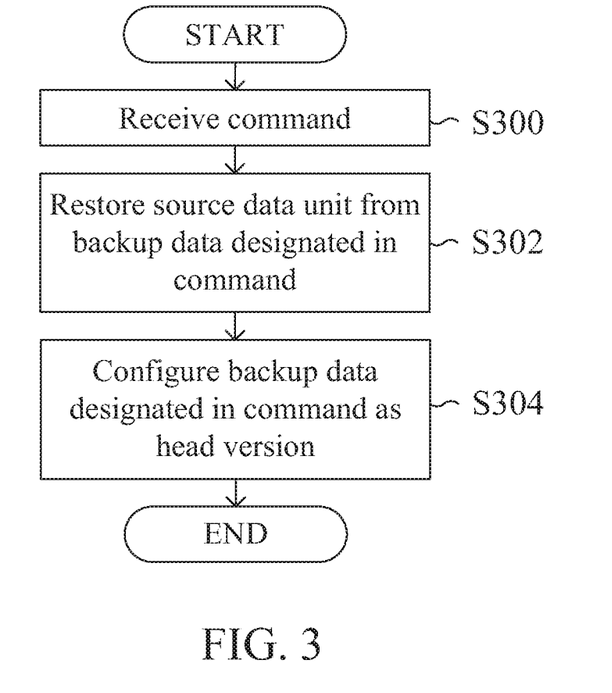
FIG. 3 is a schematic flowchart illustrating steps in a data restoring stage of a method for managing backup data units according to an embodiment of the present invention.

Hereinafter, data-restoring operations according to the present invention will be described with reference to FIG. 2 and further to the flowchart of FIG. 3.

In response to a data-restoring command received at time point T4 (Step S300), a designated backup data unit, e.g. the backup data unit B created at time point T2, is located and used for restoring the source data unit (Step S302). Then the backup data unit B is configured to be the head version in lieu of the backup data unit C (Step S304).

In a case that the backup data unit B is now the head version, and a subsequent backup command is received at time point T5 (FIG. 2), Steps S100, S102, S104, S110, S112, S114 and S120 (FIG. 1) would be executed to derive a backup data unit D. Likewise, as indicated by the arrow 204, the backup data unit D would be established as one of next-generation versions subsequent to the head version, which is currently the backup data unit B. The backup data unit D is then configured to be the head version in lieu of the backup data unit B.

In the above-described example, the next-generation versions subsequent to the head version, i.e. the backup data unit B, include the backup data unit C and the backup data unit D. In practice, more than one next-generation version of the same backup data unit may exist at the same time.

In another case that the backup data unit B is now the head version, and a data-retrieving command is subsequently received at time point T6 (FIG. 2) in order to retrieve the backup data unit B for reference or processing purposes, the backup data unit B is first processed into a backup data unit E (hereinafter "derived copy") by way of a lightweight copy operation. The backup data unit E is then established as one of next-generation versions subsequent to the head version, which is currently the backup data unit B. Whenever the backup data unit B is required by external means, the one provided for the external means to access would be the backup data unit E instead of the backup data unit B.

Compared with the prior art, data backup methods according to the present invention do not need to repetitively write the entire backup data into files, and instead, the writing operation is required only for the lightweight-copied data. Furthermore, the lightweight-copied data with modified data blocks can be secured from being tampered with by way of any proper means. For example, a Write Once Read Many (WORM) mechanism may be adopted to protect the established copies of backup data units.

In a case that the source data unit to be backed up includes, in addition to common data, a program requiring parameters for setting up an operational environment for normal operation of the program, e.g. a virtual machine, it is desirable that the configuration parameters are duplicated and copied into the newly established backup data. For example, upon establishment of a first backup data unit in the data server, a configuration parameter of the source data unit presented at a first time point is written to the data server as a first data backup configuration. For example, the source data unit presented at the first time point may be copied to the data server as the first data backup. Alternatively, the configuration parameter is converted into a specific format first, and then stored to the data server as the first data backup. Furthermore, while establishing a second backup data unit subsequently, the first backup configuration is copied to the specified storage space as a second data backup configuration.

In a case that the data server is out of space, the backup data derived according to the present invention can be optionally deleted. Please refer to FIG. 4A. Each circle as shown indicates a specified backup data unit originated from a source data unit. The one with dual circles indicates the head version. The two backup data units connected to tail and head of an arrow indicate a backup data unit and its next-generation version, respectively. For example, the backup data unit M2 is a next-generation version of the backup data unit M1, the backup data units M3 and M4 are both next-generation versions of the backup data unit M2, the backup data units M3, M5 and M6 are both next-generation versions of the backup data unit M4, and the backup data units M7 and M8 are both next-generation versions of the backup data unit M6. The backup data unit M4 is the current head version. To automatically delete unnecessary backup data unit(s) and release space, a priority of the backup data units M1-M8 to be deleted should be determined first. According to the present invention, the priority is determined based on the relationship between the next generation versions of the backup data units M1-M8 and the current head version M4, and also refers to the time points when the backup data units M1-M8 are established. In principle, the current head version will not be deleted. Furthermore, those backup data units which are neither ancestors nor descendants of the head version will be prior ones to be deleted. On the other hand, for those backup data units which are either ancestors or descendants of the head version, the version which is established earlier or has less close kinship from the current head version will be the prior one to be deleted.

Figure 4A:
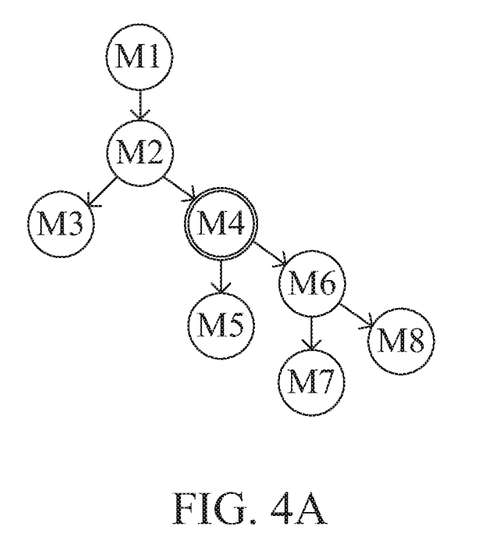
FIG. 4A is a scheme illustrating an example of parent-child relationship of backup data units according to the present invention.

An example is given herein with reference to FIG. 4A. As illustrated, the backup data unit M4 is a next-generation version of the backup data unit M2, and the backup data unit M2 is a next-generation version of the backup data unit M1. Therefore, both the backup data units M1 and M2 are ancestors of the backup data unit M4. Likewise, the backup data units M5 and M6 are next-generation versions of the backup data unit M4, and the backup data units M7 and M8 are next-generation versions of the backup data unit M6. Therefore, the backup data units M5, M6, M7 and M8 are all descendants of the backup data unit M4. Assuming that all the backup data units are not particularly protected, the backup data unit M3, which is neither an ancestor nor a descendant of the head version, would be the most prior one to be deleted when required, and then the backup data units M1, M2, M8, M7, M6 and M5 in sequence. With the deletion of one or more of the backup data units, the linkages of the deleted backup data would be removed as well.

On the other hand, for the particularly protected backup data unit(s), it would be exempted from deletion, so the sequence would pass the particularly protected backup data unit(s) and proceed to next one.

Figure 4B:
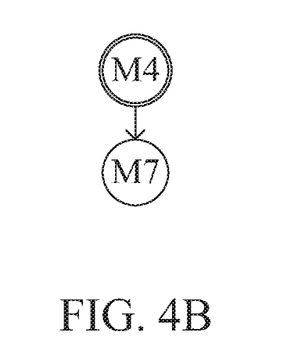
FIG. 4B is a scheme illustrating a change of the parent-child relationship of FIG. 4A provided that the backup data unit M6 is deleted.

For example, assume the backup data unit M7 is WORM-protected. Under this circumstance, it would be the backup data units M6 and M5 to be deleted subsequent to the backup data unit M8, but not the backup data unit M7. Since the child backup data unit M6 of the backup data unit M4 is deleted, the backup data unit M7 would be reconfigured to be a next-generation version of the backup data unit M4 instead of the backup data unit M6. As a result, the linkage is changed, as indicated by FIG. 4B.

Determination of priority for deletion of backup data units is optional for the present invention and the deleting procedures as described above are given for illustration only. Those skilled in the art may add, deduct or modify criteria for determining the priority based on practical designs.

Since the backup data management method according to the present invention uses a lightweight copy technology to establish a new metadata, by which the same contents of data blocks can be linked to while making next copy of backup data, the backup is fast and the requirement on storage space is low. In this way, the amount of data to be copied and the work load of the system can be largely reduced. Furthermore, as described in the above embodiments and examples, the backup data can be easily accessed, deleted, protected or duplicated as desired without complicated operational processes.

Figure 5:
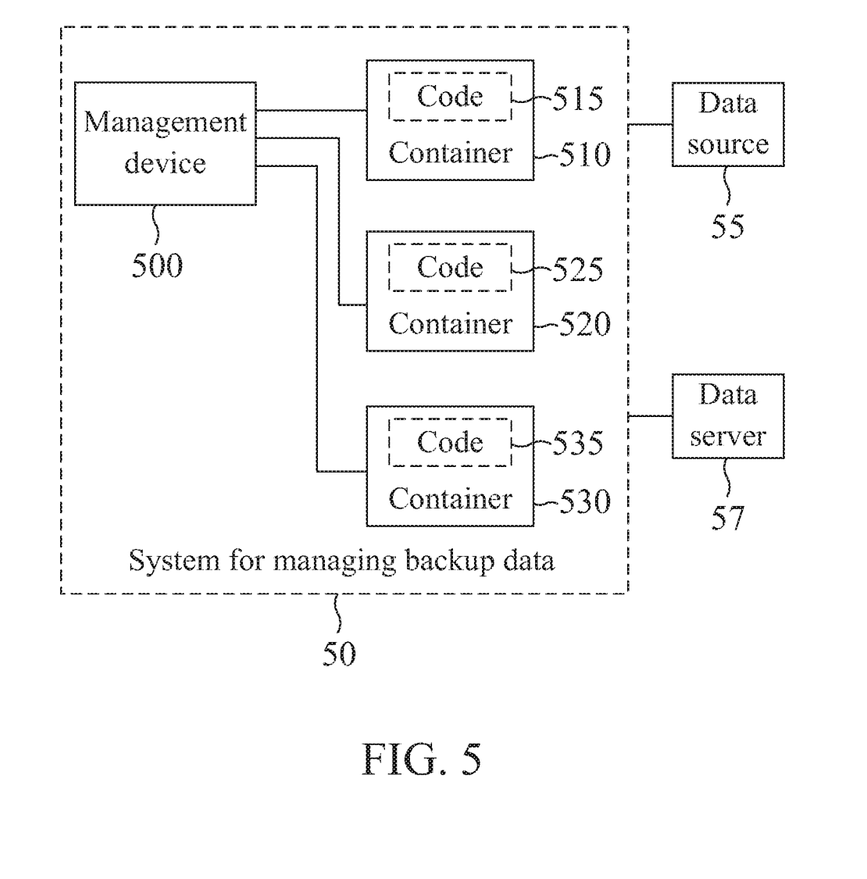
FIG. 5 is a block diagram schematically illustrating a system for managing backup data units according to an embodiment of the present invention.
Figure 6:
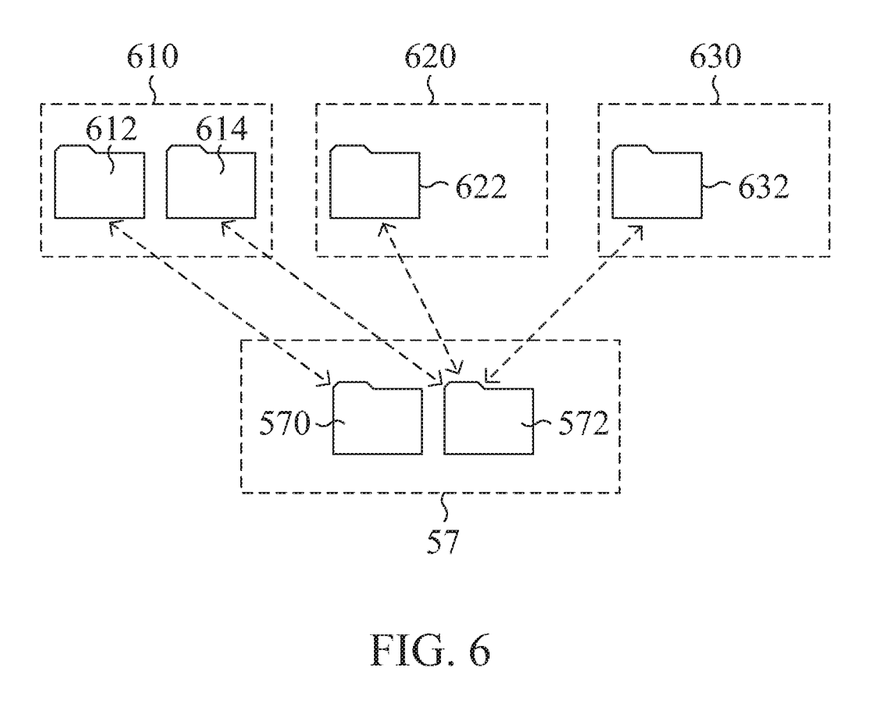
FIG. 6 is a block diagram illustrating relationship among file directories.

In another aspect, the present invention provides a system for managing backup data units. Please refer to FIGS. 5 and 6, wherein FIG. 5 schematically illustrates a block diagram of an embodiment of the system according to the present invention, and FIG. 6 is a scheme illustrating relationship among file directories. The system 50 includes a management device 500 and independent containers 510, 520 and 530 electrically coupled to the management device 500 for signal transmission. The container 510 includes a code 515, the container 520 includes a code 525, the container 530 includes a code 535, and the system 50 can access data from a data source 55 and a data server 57. Alternatively, different codes may be included in the same container. For example, it is also feasible that the container 510 includes the code 515, and the container 520 includes the code 525 and the code 535, while the container 530 is omitted.

In this embodiment, each code can be executed by the container where it is contained to generate a corresponding instance. Furthermore, each code can generate respective instances corresponding to different call sources, so plural instances may be in operation at the same time.

For better understanding, an example of data backup means is given as follows and described with reference to FIGS. 1, 6 and 7. For example, the code 515 is executable to generate an instance 610, which is adapted to have contents of a virtual directory 612 copied to a virtual directory 614 in a lightweight copy manner; the code 525 is executable to generate an instance 620, which is adapted to have data retrieved from the data source 55 written into a virtual directory 622; and the code 535 is executable to generate an instance 630, which is adapted to enable a filesystem to conduct a WORM protecting operation for protecting the contents in a virtual directory 632. By operating the instances 610, 620 and 630, linking the virtual directory 612 to a physical directory 570, where a specified backup data unit, e.g. the head version, is stored, and linking the virtual directories 614, 622 and 632 to a physical directory 572, where a newly derived backup data unit is stored, the system 50 can accomplish the data backup unit from the physical directory 570 to the physical directory 572.

Figure 7:
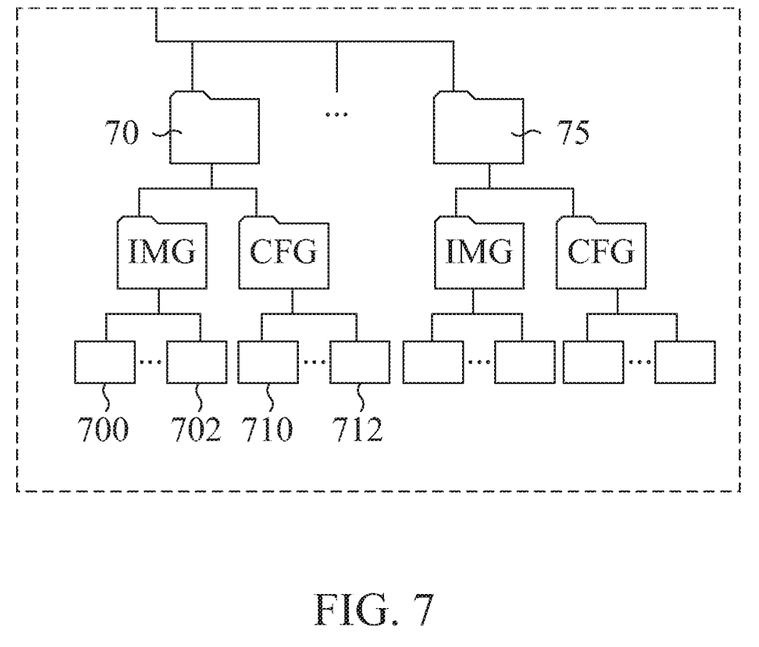
FIG. 7 is a block diagram illustrating file directories included in the physical directory of FIG. 6.

The above-mentioned physical directories 570 and 572 may be implemented with the directories 70 and 75 as shown in FIG. 7. The directory 70 contains an imagefile directory IMG and a configuration file directory CFG, wherein the image file directory IMG includes a plurality of data files 700, 702, etc., and the configuration file directory CFG also includes a plurality of configuration files 710, 712, etc. One or more files in the directory 70, which are designated by the management device 500, can be backed up into the directory 75 through the instance 610 in a lightweight manner. The designated files to be backed up in a lightweight copy manner may, for example, include one or more in the image file directory IMG and one or more in the configuration file directory CFG. Alternatively, the designated files to be backed up in a lightweight copy manner may all be the ones in the image file directory IMG, and meanwhile, the files in the configuration file directory CFG are backed up by way of common copy mechanisms. Subsequently, the data from the data source, i.e. the above-mentioned differential data contents, is written into the corresponding files in the image file directory IMG and the configuration file directory CFG of the directory 75 through the instance 620, thereby updating an existent file or building up a new file. Furthermore, through the instance 630, the directory 75 can be protected by way of WORM protecting mechanism.

By using different containers to include and execute required codes and combining functions of different containers, the management device 500 can issue proper commands and parameters to the containers to have required instances executed. For example, the above three containers 510, 520 and 530 may be packaged as a pod and operated in the same node. Meanwhile, the type of data source to be accessed, e.g. hyper-V VM, VSphere VM or Oracle Database, can be easily changed by changing the code 525 into another code, thereby retrieving data from distinct data source. Furthermore, by changing containers exhibiting different functions and/or changing operational orders of the containers, the system 50 can achieve data backup objects in different ways.

According to the present invention, the above-described system 50 may be implemented with a K8S (Kubernetes) architecture or any other suitable architecture in compliance with container orchestration.

It is understood from the above descriptions that the method and system for managing backup data according to the present invention takes advantages of lightweight copy and differential data contents written into the lightweight-copied data to conduct data backup. Therefore, the data backup operation can be performed with a minimized operational space. Moreover, by establishing parent-child relationships of backup data units, which are derived from the same source data unit at different time points by way of lightweight copy with a write-once-read-many (WORM) protecting mechanism, the amount of operations for restoring data can also be minimized.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for managing backup data units, adapted to be used for managing backup data units stored in a data server, the backup data units including a first backup data unit established by copying a source data unit into the data server in response to a data backup command received at a first time point, the method comprising:
acquiring a specified storage space in response to a data backup command received at a second time point;
copying the first backup data unit to the specified storage space in a lightweight copy manner;
writing differential data contents between a source data unit presented at the second time point and the source data unit presented at the first time point into the lightweight-copied first backup data unit in the specified storage space; and
defining the resulting data stored in the specified storage space as a second backup data unit,
wherein the second time point is later than the first time point.

2. The method according to claim 1, wherein upon establishment of the first data backup data unit in the data server, a configuration parameter of the source data unit presented at the first time point is written to the data server as a first data backup configuration, and while establishing the second backup data unit, the first backup configuration is copied to the specified storage space as a second data backup configuration.

3. The method according to claim 2, wherein the configuration parameter of the source data unit presented at the first time point is copied to the data server as the first data backup configuration.

4. The method according to claim 2, wherein the configuration parameter of the source data unit presented at the first time point is converted into a preset format and then stored to the data server as the first data backup configuration.

5. The method according to claim 1, wherein if the first backup data unit is a head version up to the second time point, and the second backup data unit is a next-generation version, the method further comprises configuring the second backup data unit to be the head version in lieu of the first backup data unit from the second time point.

6. The method according to claim 5, wherein when the second backup data unit is a head version and it is required to delete one of the backup data stored in the data server, a priority to delete the backup data units is determined based on a kinship from the second backup data unit and/or an established order.

7. The method according to claim 1, wherein the backup data units stored in the server further include a third backup data unit, a fourth backup data unit, which is a next-generation version of the third backup data unit, and a fifth backup data unit, which is a next-generation version of the fourth backup data unit, and the method further comprises:
deleting the fourth backup data unit in response to a data deletion command;
removing the fourth backup data unit from a next-generation version group of the third backup data unit; and
configuring the fifth backup data unit to be a member of a next-generation version group of the third backup data unit.

8. The method according to claim 1, further comprising:
protecting the second backup data unit by way of a write-once-read-many (WORM) protecting mechanism.

9. The method according to claim 1, further comprising:
copying the first backup data unit in a lightweight copy manner to generate a lightweight-copied backup data unit in response to an access command to the first backup data unit received at a third time point;

configuring the lightweight-copied backup data unit to be another next-generation version of the first backup data unit; and providing the lightweight-copied backup data unit to be accessed.

10. A method for managing backup data units, comprising:

determining whether a head version of backup data unit corresponding to a source data unit to be backed up is existent in a data server when a data backup command is received;

lightweight-copying the head version into a specified storage space of the data server to generate a lightweight-copied backup data unit if the head version is existent in the data server;

copying differential data contents into the lightweight-copied backup data unit to generate a next-generation version in the specified storage space, wherein the differential data contents indicate a difference between a source data unit presented when the head version is generated and the source data unit presented when data backup command is received; and updating the next-generation version to the head version.

11. The method according to claim 10, wherein a first backup data unit established by copying the source data unit into the data server is configured to be the head version if there is no head version of backup data unit existent in the data server.

* * * * *